US012673494B2

(12) United States Patent
Matsuda et al.

(10) Patent No.: US 12,673,494 B2
(45) Date of Patent: Jul. 7, 2026

(54) LIQUID DISCHARGE HEAD, HEAD MODULE, LIQUID DISCHARGE UNIT, AND LIQUID DISCHARGE APPARATUS

(71) Applicants: Yukimasa Matsuda, Kanagawa (JP); Keishi Miwa, Kanagawa (JP); Yu Watanabe, Kanagawa (JP)

(72) Inventors: Yukimasa Matsuda, Kanagawa (JP); Keishi Miwa, Kanagawa (JP); Yu Watanabe, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 280 days.

(21) Appl. No.: 18/536,273

(22) Filed: Dec. 12, 2023

(65) Prior Publication Data

US 2024/0198672 A1 Jun. 20, 2024

(30) Foreign Application Priority Data

Dec. 16, 2022 (JP) ................................. 2022-200787
Oct. 10, 2023 (JP) ................................. 2023-175296

(51) Int. Cl.
*B41J 2/14* (2006.01)
*B41J 2/175* (2006.01)
*B41J 11/00* (2006.01)

(52) U.S. Cl.
CPC ......... *B41J 2/14233* (2013.01); *B41J 2/1433* (2013.01); *B41J 2/175* (2013.01); *B41J 11/007* (2013.01); *B41J 2202/11* (2013.01)

(58) Field of Classification Search
CPC ...... B41J 2/14233; B41J 2/1623; B41J 2/161; B41J 2/14201; B41J 2/1433;
(Continued)

(56) References Cited

U.S. PATENT DOCUMENTS 7,645,030 B2 * 1/2010 Koseki ..................... B41J 2/145
347/69
9,802,405 B2 * 10/2017 Hollands .............. B41J 2/14201
(Continued)

FOREIGN PATENT DOCUMENTS

JP 2003-205612 A 7/2003
JP 2015-174387 A 10/2015
JP 2019-217706 A 12/2019

OTHER PUBLICATIONS

U.S. Appl. No. 18/368,035, filed Sep. 14, 2023.
U.S. Appl. No. 18/364,826, filed Aug. 3, 2023.
U.S. Appl. No. 18/499,661, filed Nov. 1, 2023.

*Primary Examiner* — John P Zimmermann
(74) *Attorney, Agent, or Firm* — XSENSUS LLP

(57) ABSTRACT

A liquid discharge head includes a chamber substrate, a nozzle substrate, a damper, and a frame substrate. The chamber substrate includes a pressure chamber and a pressure generator to change a volume of the pressure chamber. The chamber substrate has a first face and a second face opposite to the first face. The nozzle substrate is disposed on the first face in a lamination direction. The nozzle substrate has a nozzle communicating with the pressure chamber. The damper is disposed on the second face in the lamination direction. The frame substrate is disposed over the damper in the lamination direction. The chamber substrate has a first area in an in-plane direction of the chamber substrate. The nozzle substrate has a second area smaller than the first area in the in-plane direction. The frame substrate has a third area larger than the first area in the in-plane direction.

17 Claims, 12 Drawing Sheets

(58) Field of Classification Search

CPC .... B41J 2002/14491; B41J 2002/14419; B41J 2202/20

See application file for complete search history.

(56) References Cited

U.S. PATENT DOCUMENTS

| | | | | |
|---|---|---|---|---|
| 12,187,047 | B2 * | 1/2025 | Watanabe | B41J 2/175 |
| 12,384,153 | B2 * | 8/2025 | Sato | B41J 2/14233 |
| 2014/0085379 | A1 * | 3/2014 | Horiguchi | B41J 2/14209 347/40 |
| 2015/0171307 | A1 | 6/2015 | Masuda et al. | |
| 2016/0001556 | A1 | 1/2016 | Masuda et al. | |
| 2017/0066247 | A1 * | 3/2017 | Mizuno | B41J 2/175 |
| 2017/0100934 | A1 | 4/2017 | Masuda et al. | |
| 2018/0264807 | A1 * | 9/2018 | Ito | B41J 2/161 |
| 2018/0290446 | A1 * | 10/2018 | Kohda | B41J 2/1433 |
| 2019/0143683 | A1 * | 5/2019 | Nishikawa | B41J 2/14072 347/50 |
| 2019/0275796 | A1 | 9/2019 | Miwa | |
| 2020/0298569 | A1 | 9/2020 | Miwa | |
| 2020/0298570 | A1 | 9/2020 | Masuda et al. | |
| 2020/0338886 | A1 * | 10/2020 | Nishiwaki | B41J 2/055 |
| 2021/0016568 | A1 | 1/2021 | Miwa | |
| 2021/0036208 | A1 | 2/2021 | Shimofuku et al. | |
| 2021/0162759 | A1 | 6/2021 | Miwa et al. | |
| 2021/0370675 | A1 | 12/2021 | Yoshita et al. | |
| 2023/0049164 | A1 | 2/2023 | Toyota et al. | |
| 2023/0106664 | A1 | 4/2023 | Miwa | |
| 2023/0130058 | A1 | 4/2023 | Miwa | |
| 2023/0135522 | A1 | 5/2023 | Watanabe et al. | |
| 2023/0139963 | A1 | 5/2023 | Miwa | |
| 2023/0249453 | A1 | 8/2023 | Watanabe | |
| 2023/0249461 | A1 | 8/2023 | Matsuda et al. | |
| 2023/0286277 | A1 | 9/2023 | Watanabe | |
| 2023/0294403 | A1 | 9/2023 | Nagahashi et al. | |
| 2023/0330990 | A1 | 10/2023 | Fujimura et al. | |

* cited by examiner

FIG. 8A COMPARATIVE EXAMPLE
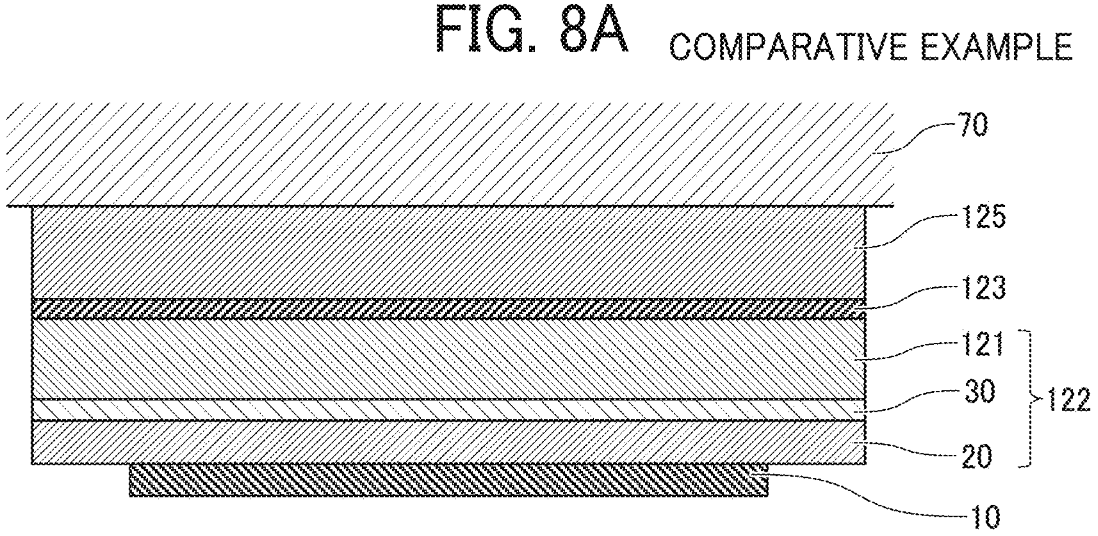
FIG. 8B COMPARATIVE EXAMPLE
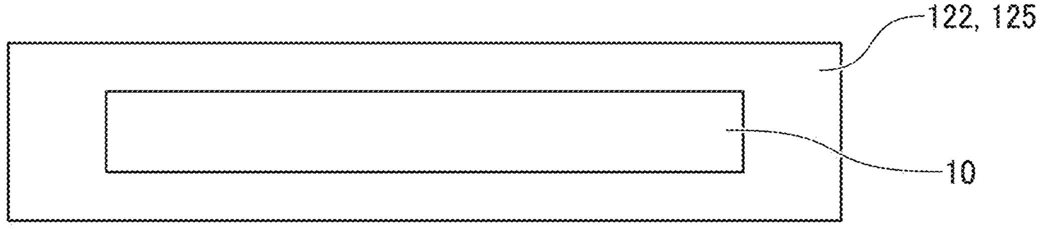
FIG. 8C COMPARATIVE EXAMPLE
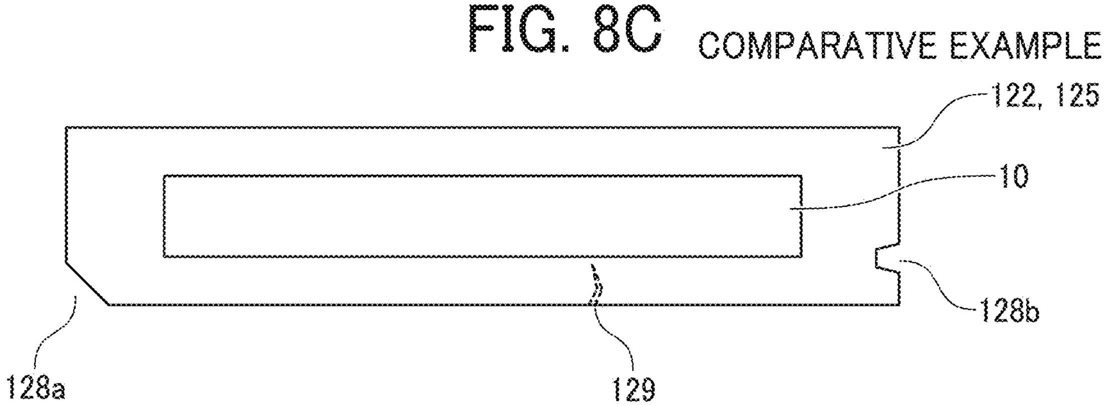

LIQUID DISCHARGE HEAD, HEAD MODULE, LIQUID DISCHARGE UNIT, AND LIQUID DISCHARGE APPARATUS

CROSS-REFERENCE TO RELATED APPLICATIONS

This patent application is based on and claims priority pursuant to 35 U.S.C. § 119(a) to Japanese Patent Application Nos. 2022-200787, filed on Dec. 16, 2022, and 2023-175296, filed on Oct. 10, 2023, in the Japan Patent Office, the entire disclosure of each of which is hereby incorporated by reference herein.

BACKGROUND

Technical Field

Embodiments of the present disclosure relate to a liquid discharge head, a head module, a liquid discharge unit, and a liquid discharge apparatus.

Related Art

In the related art, a liquid discharge head includes a nozzle substrate, a liquid chamber substrate, and a holding substrate, which are joined to each other.

Each substrate includes the following items, for example. The nozzle substrate has a nozzle from which a liquid is discharged. The liquid chamber substrate has a pressure chamber communicating with the nozzle and includes a pressure generator to apply pressure to the pressure chamber. The holding substrate is joined to the liquid chamber substrate to hold the liquid chamber substrate. The liquid chamber substrate has a channel through which the liquid flows, and the holding substrate may also have another channel through which the liquid flows, if desired.

SUMMARY

Embodiments of the present disclosure describe an improved liquid discharge head that includes a chamber substrate, a nozzle substrate, a damper, and a frame substrate. The chamber substrate includes a pressure chamber and a pressure generator to apply pressure to the pressure chamber to change a volume of the pressure chamber. The chamber substrate has a first face and a second face opposite to the first face. The nozzle substrate is disposed on the first face of the chamber substrate in a lamination direction. The nozzle substrate has a nozzle communicating with the pressure chamber. The damper is disposed on the second face of the chamber substrate in the lamination direction. The frame substrate is disposed over the damper in the lamination direction. The chamber substrate has a first area in an in-plane direction of the chamber substrate orthogonal to the lamination direction. The nozzle substrate has a second area smaller than the first area in the in-plane direction. The frame substrate has a third area larger than the first area in the in-plane direction.

According to another embodiment of the present disclosure, there is provided a liquid discharge head including a chamber substrate, a nozzle substrate, and a frame substrate. The chamber substrate made of silicon includes a pressure chamber and a pressure generator to apply pressure to the pressure chamber to change a volume of the pressure chamber. The chamber substrate has a first face and a second face opposite to the first face. The nozzle substrate is disposed on the first face of the chamber substrate in a lamination direction. The nozzle substrate is made of silicon and has a nozzle communicating with the pressure chamber. The frame substrate is made of silicon and disposed over the second face of the chamber substrate in the lamination direction. The chamber substrate has a first area in an in-plane direction of the chamber substrate orthogonal to the lamination direction. The nozzle substrate has a second area smaller than the first area in the in-plane direction. The frame substrate has a third area larger than the first area in the in-plane direction.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 8A is a cross-sectional view of a liquid discharge head according to a comparative example: FIG. 8B is a plan view of a liquid discharge head according to a comparative example: FIG. 8C is a plan view of a liquid discharge head having a crack according to a comparative example;

Figure 1:
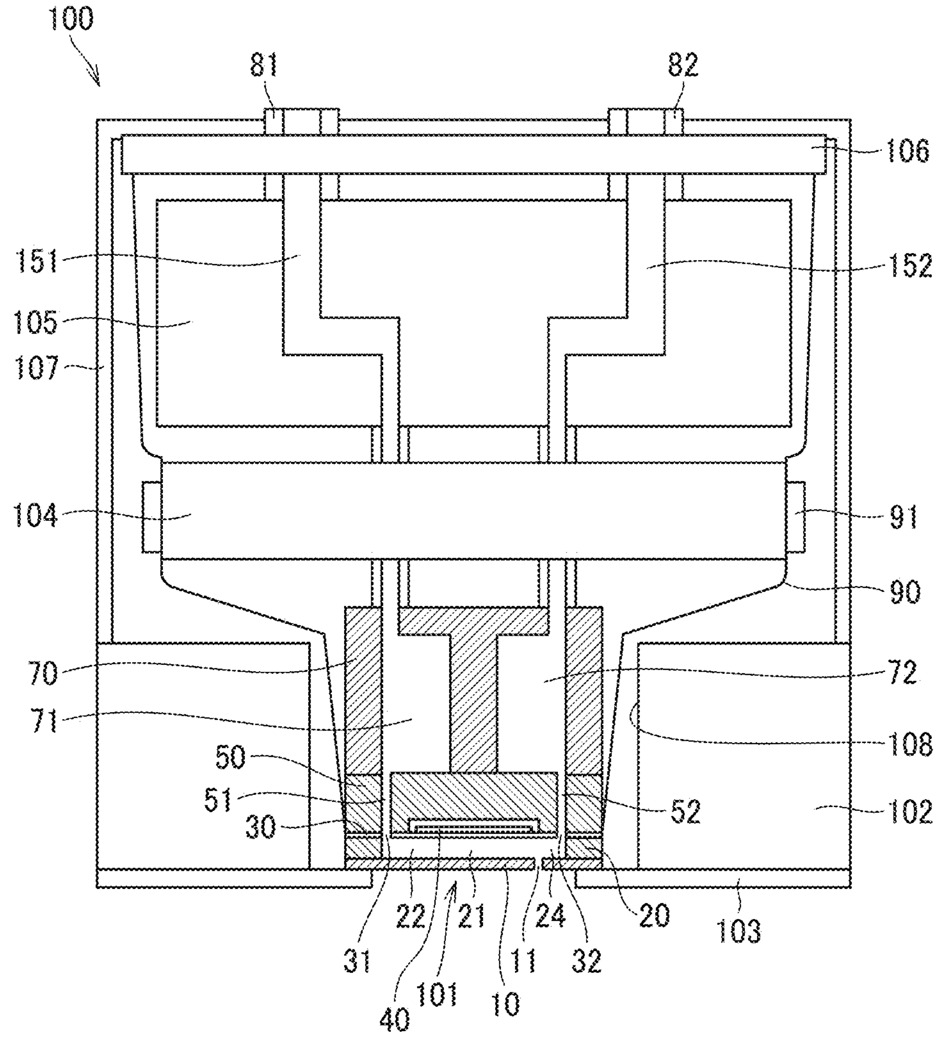
FIG. 1 is a cross-sectional view of a head module in a transverse direction of the head according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity.

However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a.” “an,” and “the” are intended to include the plural forms as well, unless the context clearly indicates otherwise.

A liquid discharge head, a head module, a liquid discharge unit, and a liquid discharge apparatus according to embodiments of the present disclosure will be described with reference to the drawings. Embodiments of the present disclosure are not limited to the embodiments described below and may be other embodiments than the embodiments described below. The following embodiments may be modified by, for example, addition, modification, or omission within the scope that would be obvious to one skilled in the art. Any aspects having advantages as described for the following embodiments according to the present disclosure are included within the scope of the present disclosure.

Liquid Discharge Head and Head Module

A liquid discharge head according to an embodiment of the present disclosure includes: a liquid chamber substrate (may be referred to simply as a chamber substrate) that has a pressure chamber with a volume changed by a pressure generator; a nozzle substrate that has a nozzle corresponding to the pressure chamber and is joined to the liquid chamber substrate: and a frame substrate that is joined to the liquid chamber substrate on a side opposite to a side to which the nozzle substrate is joined. At least a part between the frame substrate and the liquid chamber substrate has a damper. The liquid chamber substrate has an outer shape larger than an outer shape of the nozzle substrate, and the frame substrate has an outer shape larger than the outer shape of the liquid chamber substrate, in a plane in a lamination direction of the substrates.

A head module according to the present embodiment includes multiple liquid discharge head according to the present embodiment.

In the present embodiment, by increasing a size of a substrate having little influence on the liquid discharging performance in a surface direction of the substrate, a substrate having the influence on the liquid discharging performance can be prevented from contacting, for example, components outside the liquid discharge head. Accordingly, it is possible to reduce the damage on the substrate having the influence on the liquid discharging performance and to increase the yield rate of the liquid discharge head.

Figure 2:
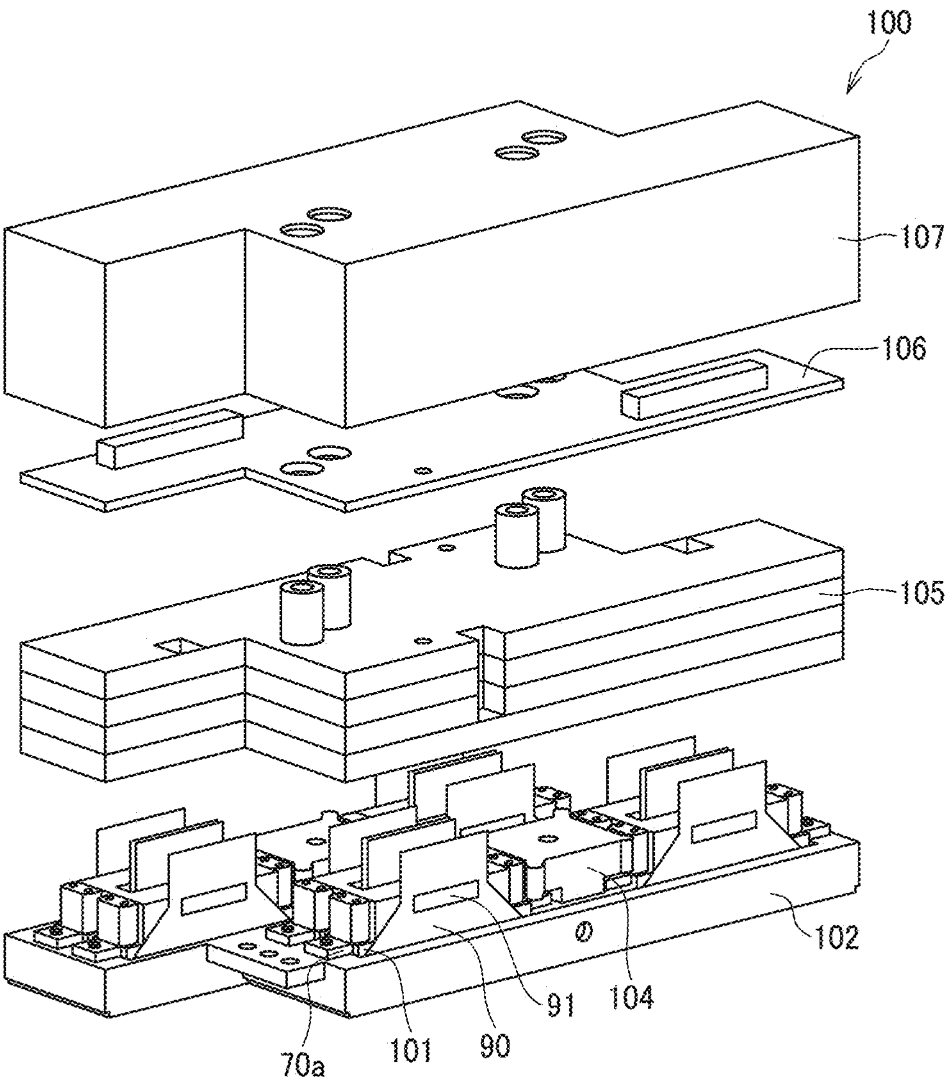
FIG. 2 is an exploded perspective view of the head module of FIG. 1.
Figure 3:
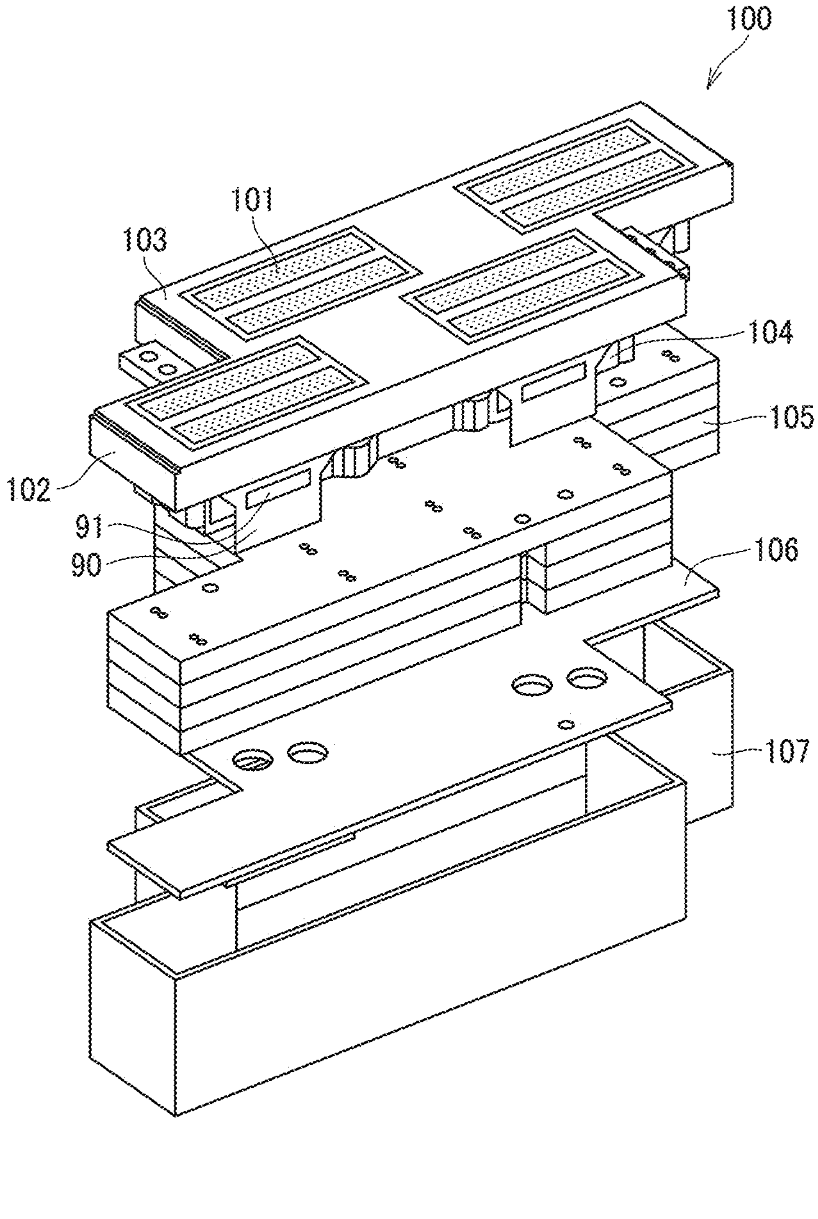
FIG. 3 is an exploded perspective view of the head module of FIG. 1 as viewed from a nozzle face side.
Figure 4:
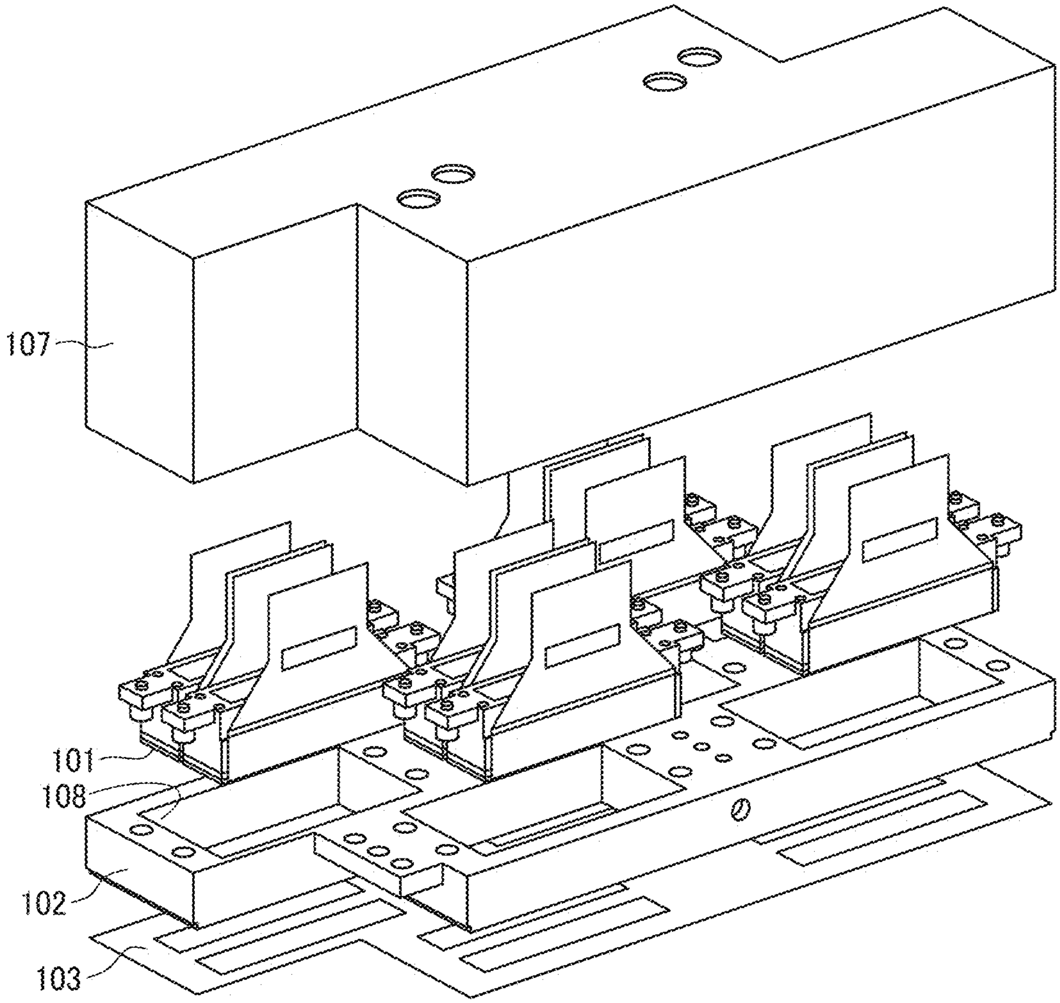
FIG. 4 is an exploded perspective view of a head, a base member, and a cover member of the head module of FIG. 1.

The liquid discharge head and the head module according to the present embodiment will be described with reference to FIGS. 1 to 4. FIG. 1 is a cross-sectional view of the head module according to the present embodiment in a transverse direction of the liquid discharge head. FIG. 2 is an exploded perspective view of the head module of FIG. 1. FIG. 3 is an exploded perspective view of the head module of FIG. 1 as viewed from a nozzle face side. FIG. 4 is an exploded perspective view of the liquid discharge head, a base, and a cover of the head module of FIG. 1.

A head module 100 includes multiple heads 101 serving as the liquid discharge heads to discharge a liquid, a base 102, a cover 103, a heat radiator 104, a manifold 105, a printed circuit board (PCB) 106, and a module case 107.

Each of the heads 101 includes a nozzle substrate 10, a channel substrate 20, a diaphragm 30, a holding substrate 50, and a frame member 70. The each of the heads 101 is the liquid discharge head according to the present embodiment.

The nozzle substrate 10 has a nozzle 11. The channel substrate 20 has a pressure chamber 21 communicating with the nozzle 11. The pressure chamber 21 may be referred to as, for example, an individual liquid chamber. The diaphragm 30 forms a part of the pressure chamber 21 and is vibrated by a piezoelectric element 40. The holding substrate 50 is laminated over the diaphragm 30. The frame member 70 is laminated over the holding substrate 50. The frame member 70 may be referred to as, for example, a common channel member.

The channel substrate 20 forms, in addition to the pressure chamber 21, a supply-side individual channel 22 communicating with the pressure chamber 21 and a collection-side individual channel 24 communicating with the pressure chamber 21. The channel substrate may be referred to as, for example, an individual channel plate.

The holding substrate 50 forms a supply-side intermediate individual channel 51 and a collection-side intermediate individual channel 52. The supply-side intermediate individual channel 51 communicates with the supply-side individual channel 22 via an opening 31 of the diaphragm 30. The collection-side intermediate individual channel 52 communicates with the collection-side individual channel 24 via an opening 32 of the diaphragm 30. The holding substrate 50 may be referred to as, for example, an intermediate channel plate.

The holding substrate 50 may include a plurality of substrates, and in the present embodiment, the holding substrate 50 includes a first holding substrate and a second holding substrate. As described later, the liquid chamber substrate according to the present embodiment includes the channel substrate 20 and the first holding substrate that is a part of the holding substrate 50. The liquid chamber substrate according to the present embodiment is joined to the nozzle substrate 10 and joined to the second holding substrate that is a part of the holding substrate 50.

The frame member 70 forms a supply-side common channel 71 and a collection-side common channel 72. The supply-side common channel 71 communicates with the supply-side intermediate individual channel 51. The collection-side common channel 72 communicates with the collection-side intermediate individual channel 52. The supply-side common channel 71 communicates with a supply port 81 via a channel 151 of the manifold 105. The collection-side common channel 72 communicates with a collection port 82 via a channel 152 of the manifold 105. The frame member 70 may be referred to as a common channel member.

The PCB 106 and the piezoelectric element 40 of the head 101 are coupled via a flexible wiring member 90. The flexible wiring member 90 is provided with a driver integrated circuit (IC) 91 (i.e., a drive circuit).

In the present embodiment, the multiple heads 101 are mounted on the base 102 at intervals. The head 101 is mounted on the base 102 such that the head 101 is inserted into an opening 108 in the base 102, and a peripheral edge portion of the nozzle substrate 10 of the head 101 is joined and fixed to the cover 103 joined to the base 102. The head 101 includes a flange **70*a* outside the frame member 70. The flange 70*a* is joined and fixed to the base 102**.

A structure for fixing the head 101 to the base 102 is not limited to any particular structure. For example, the head 101 may be fixed to the base 102 through bonding, caulking, swaging, riveting, and screwing.

The base 102 is preferably made of a material having a low coefficient of linear expansion.

For example, 42Alloy that is alloy of iron with nickel or an invar material may be used. In the present embodiment, the invar material is used. Accordingly, since an amount of expansion of the base 102 is small even when the head 101 generates heat and a temperature of the base 102 rises, the nozzle is less likely to shift from a predetermined nozzle position. As a result, a landing position of the liquid can be prevented from deviating from a desired position.

Each of the nozzle substrate 10, the channel substrate 20, and the diaphragm 30 is made of monocrystalline silicon substrate (i.e., includes silicon), and has substantially the same coefficient of linear expansion as the base 102. Thus, the deviation of the nozzle due to thermal expansion can be reduced.

Figure 5:
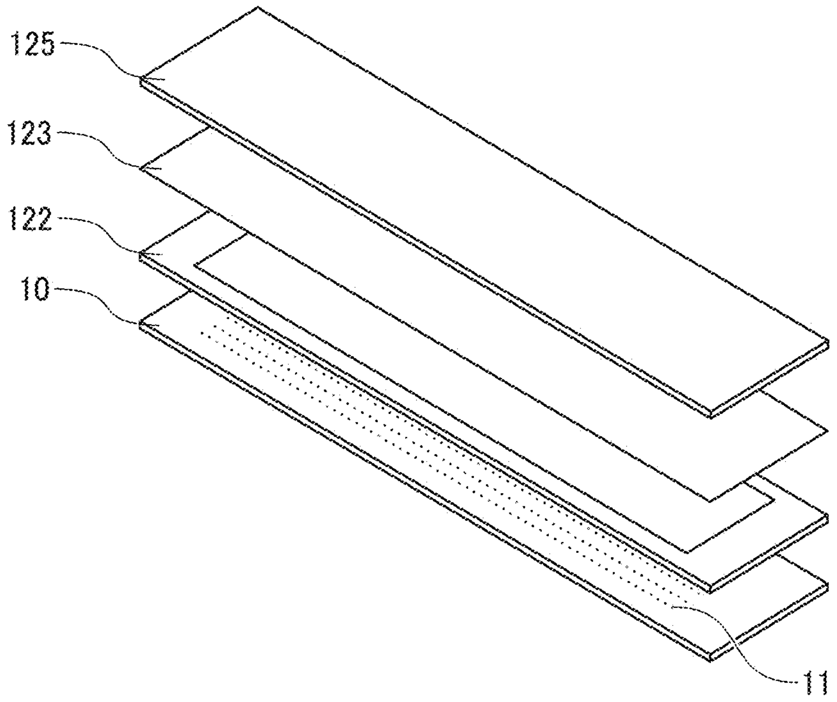
FIG. 5 is an exploded perspective view of a liquid discharge head according to an embodiment of the present disclosure.

FIG. 5 is an exploded perspective view of the liquid discharge head according to the present embodiment. However, FIG. 5 is a reference diagram, and sizes of the substrates does not necessarily represent a configuration of the present embodiment.

A liquid chamber substrate (chamber substrate) 122 is joined to the nozzle substrate 10. The liquid chamber substrate 122 is joined to a damper frame 125 (i.e., the second holding substrate). Between the liquid chamber substrate 122 and the damper frame 125, a damper 123 is at least partially disposed. For example, the damper 123 dissipates energy of the piezoelectric element 40 to reduce impact. A method for joining the substrates is not limited to any particular method, and can be appropriately selected. For example, a method using an adhesive can be used.

In the present embodiment, the holding substrate 50 includes the first holding substrate and the second holding substrate, and the damper frame 125 serves as the second holding substrate. A sub-frame 121, which is described later, serves as the first holding substrate. In the present embodiment, the liquid chamber substrate 122 includes the sub-frame 121. In other words, the liquid chamber substrate 122 includes a part of the holding substrate 50 (i.e., the first holding substrate) (see FIG. 6). Accordingly, in FIG. 1, a portion including a part of the holding substrate 50 (i.e., the first holding substrate) and the channel substrate 20 serves as the liquid chamber substrate 122.

As described above, the nozzle substrate 10 has the nozzle 11 from which a liquid is discharged. The liquid chamber substrate 122 has the pressure chamber 21 corresponding to the nozzle and includes the piezoelectric element 40 (a pressure generator) to apply pressure to the pressure chamber. The piezoelectric element 40 converts electrical energy into mechanical energy such as displacement and force to contribute to liquid discharge.

Figure 6:
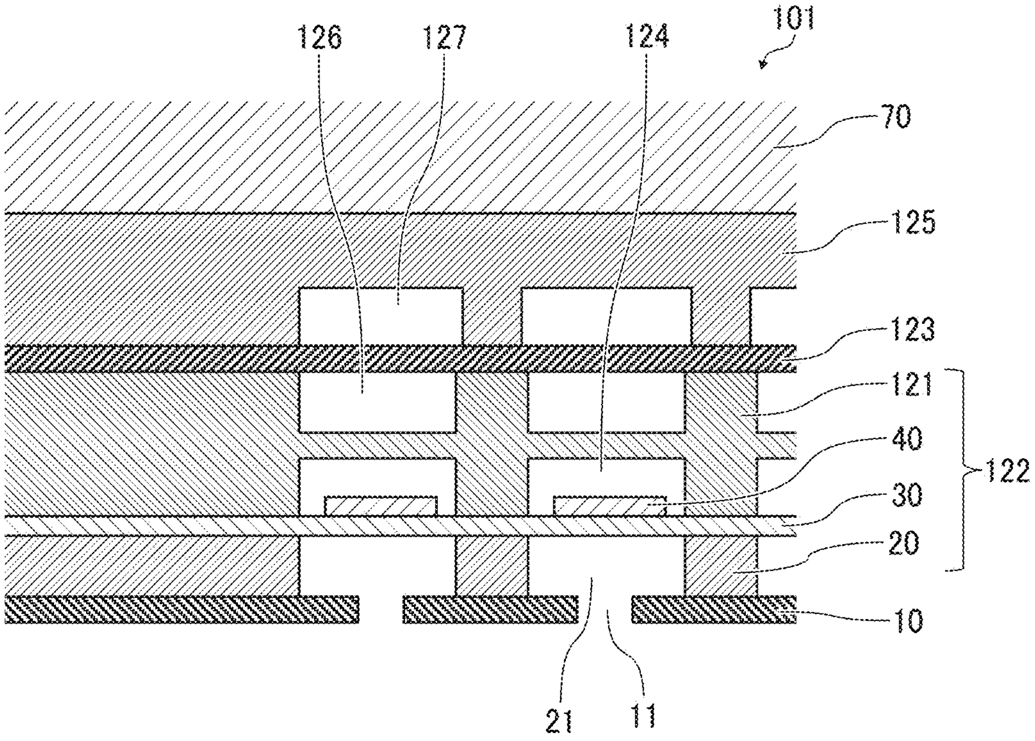
FIG. 6 is a cross-sectional view of a liquid discharge head according to an embodiment of the present disclosure.

FIG. 6 is an enlarged cross-sectional view of a part of the head 101 illustrated in the cross-sectional view of FIG. 1.

The head 101 according to the present embodiment includes the liquid chamber substrate 122, the nozzle substrate 10, and the damper frame 125. The liquid chamber substrate 122 has the pressure chamber 21 with a volume changed by the piezoelectric element 40 (the pressure generator). The nozzle substrate 10 has the nozzle 11 corresponding to the pressure chamber 21 and is joined to the liquid chamber substrate 122. The damper frame 125 is joined to the liquid chamber substrate 122 on a side opposite to a side to which the nozzle substrate 10 is joined.

The liquid chamber substrate 122 according to the present embodiment may include one substrate or multiple substrates. In the present embodiment, the liquid chamber substrate 122 includes the channel substrate 20 and the sub-frame 121. The sub-frame 121 is a part of the holding substrate 50, and may be referred to as, for example, the first holding substrate.

The liquid chamber substrate 122 according to the present embodiment includes the piezoelectric element 40 serving as the pressure generator and the diaphragm 30. The diaphragm 30 is deformed by the piezoelectric element 40 to change the volume of the pressure chamber 21.

When the volume of the pressure chamber 21 changes, droplets of the liquid are discharged from the nozzle 11. The nozzle 11 is a hole for discharging the liquid to the outside as the droplets. For example, the liquid includes ink, and droplets of ink may be referred to as, for example, ink droplets.

The sub-frame 121 has a gap 124 for securing a drive region of the piezoelectric element 40 in the channel substrate 20 side. The sub-frame 121 is joined to the damper 123 and has a first damper chamber 126. The first damper chamber 126 is disposed so as to secure a space in which the damper 123 can vibrate.

In the present embodiment, the damper 123 is disposed at least partially between the damper frame 125 and the liquid chamber substrate 122. The damper 123 can disperse energy generated during deformation of the piezoelectric element 40 to reduce impact.

The damper frame 125 may be referred to as a frame substrate. The nozzle substrate 10, the liquid chamber substrate 122, and the damper frame 125 may be collectively referred to as a module substrate.

The damper frame 125 according to the present embodiment has a second damper chamber 127 on the sub-frame 121 side. The second damper chamber 127 is disposed so as to secure a space in which the damper 123 can vibrate.

Materials of the substrates can be appropriately selected, and in particular, the nozzle substrate 10, the liquid chamber substrate 122, and the damper frame 125 are preferably made of silicon (Si). Such a configuration can facilitate processing such as thinning and downsizing. The liquid chamber substrate 122 may include multiple substrates such as the channel substrate 20 and the sub-frame 121 as illustrated in FIG. 6. When the liquid chamber substrate 122 includes the multiple substrates, at least one substrate included in the liquid chamber substrate 122 is preferably made of Si. In FIG. 6, one of the channel substrate 20 and the sub-frame 121 included in the liquid chamber substrate 122 is preferably made of Si, and both of the channel substrate 20 and the sub-frame 121 are more preferably made of Si. The channel substrate 20 and the sub-frame 121 made of Si allows fine processing of the channels such as the pressure chamber 21 by photolithography which is a semiconductor processing technique. As a result, the size of the liquid chamber substrate 122 can be reduced.

The liquid chamber substrate 122 may include the diaphragm 30 and the piezoelectric element 40 between the channel substrate 20 and the sub-frame 121 as illustrated in FIG. 6. In the configuration illustrated in FIG. 6, at least one of the sub-frame 121 or the channel substrate 20, which constructs the liquid chamber substrate 122, may be made of Si, and the diaphragm 30 and the piezoelectric element 40 are not necessarily made of Si. A component serving as a substrate for maintaining the structure of the liquid chamber substrate 122 is preferably made of Si.

The sub-frame 121 and the channel substrate 20 included in the liquid chamber substrate 122 are preferably made of Si, i.e., mainly made of Si. In the present embodiment, terms "made of Si" means that a main component of the portion serving as a base material for maintaining the structure of the substrate is Si. Examples of the base material include a monocrystalline silicon wafer to which a small amount of an additive, for example, a dopant such as phosphorus or boron is added. A protective film may be formed on the surfaces of the channel substrate 20 and the sub-frame 121. The protective film may be a film of an inorganic substance such as a metal oxide or metal nitride, e.g., silicon oxide, silicon nitride, or tantalum oxide, or may be a film of an organic substance such as a resin. These protective films can prevent Si, which is a base material of the channel substrate 20 and the sub-frame 121, from being eluted by the contact with a liquid such as ink.

A base material of the nozzle substrate 10 is preferably made of Si, i.e., mainly made of Si. In the present embodiment, terms "made of Si" means that a main component of the portion serving as a base material for maintaining the structure of the substrate is Si. Examples of the base material include a monocrystalline silicon wafer to which a small amount of an additive, for example, a dopant such as phosphorus or boron is added. A protective film may be formed on the surface of the nozzle substrate 10. The protective film may be a film of an inorganic substance such as a metal oxide or metal nitride, e.g., silicon oxide, silicon nitride, or tantalum oxide, or may be a film of an organic substance such as a resin. In addition, a water-repellent film having water repellency may be formed or a water-repellent treatment may be performed on a surface of the nozzle substrate 10 opposite to the surface to which the liquid chamber substrate 122 is joined. The protective film and the water-repellent film of the nozzle substrate 10 can prevent Si as a base material from being eluted by the contact with a liquid such as ink.

As described above, terms "the substrate made of Si" in the present embodiment includes any substrate of the base material including Si as the main component. The base material forming the substrate means that a main member that maintains the structure of the substrate.

Figure 7A:
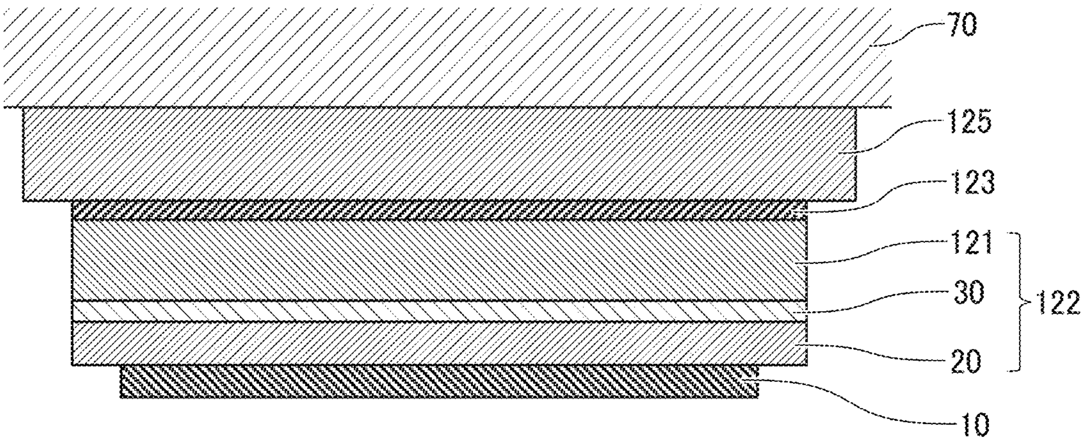
FIG. 7A is a cross-sectional view of a liquid discharge head according to an embodiment of the present disclosure.
Figure 7B:
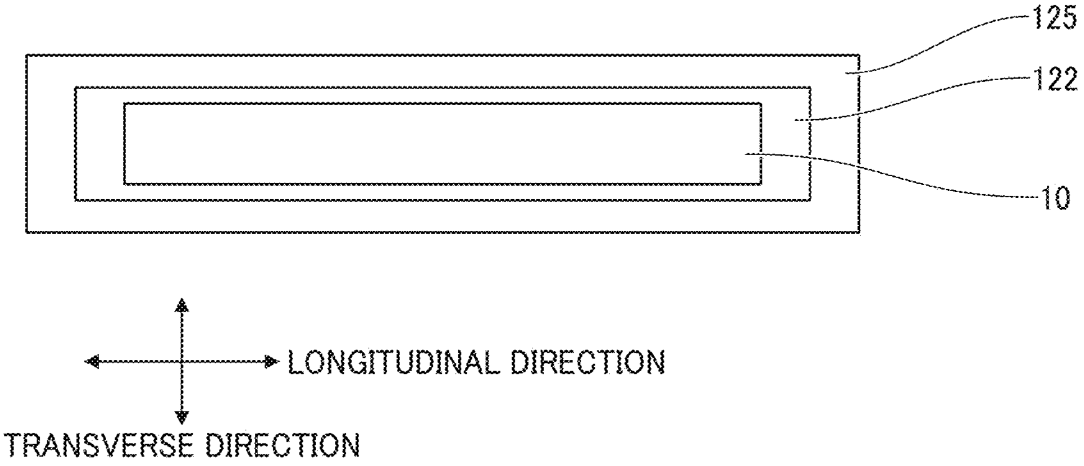
FIG. 7B is a plan view of a liquid discharge head according to an embodiment of the present disclosure.

FIGS. 7A and 7B are schematic views of the liquid discharge head according to the present embodiment. FIG. 7A is a cross-sectional view of a part of the liquid discharge head according to the present embodiment. For example, the piezoelectric element, the channel, and the pressure chamber are omitted for the sake of description. FIG. 7B is a plan view of the part of the liquid discharge head according to the present embodiment as viewed in the lamination direction of the substrates. For example, the nozzle is omitted in FIG. 7B.

The liquid discharge head according to the present embodiment, as illustrated in FIG. 7B, includes the liquid chamber substrate 122 having an outer shape larger than an outer shape of the nozzle substrate 10, and the damper frame 125 having an outer shape larger than the outer shape of the liquid chamber substrate 122, in plan view in the lamination direction of the substrates. In other words, the damper frame 125 is the largest or has an outermost circumference among the nozzle substrate 10, the liquid chamber substrate 122, and the damper frame 125 in the lamination direction of the substrates.

In the present embodiment, the damper frame 125, which is less likely to be affected by chips, scratches, and cracks, is the largest in plan view. In the present embodiment, sizes of the damper frame 125, the liquid chamber substrate 122, and the nozzle substrate 10 decrease in this order in plan view (i.e., the plane of the substrates). In other words, areas of the substrates are reduced toward the nozzle. The sizes of the substrates are adjusted such that the damper frame 125 has the outermost circumference among the nozzle substrate 10, the liquid chamber substrate 122, and the damper frame 125. The term "plane" corresponds to a surface direction (in-plane direction) of the substrates.

Since the damper frame 125 is larger than the liquid chamber substrate 122 in the plane, for example, the liquid chamber substrate 122 can be prevented from coming into contact with the outside during the joining of the substrates, and the liquid chamber substrate 122 can be prevented from being chipped, scratched, or cracked due to the contact with the outside. Accordingly, a decrease in the yield rate can be prevented. The term "contact with the outside" includes, in addition to the contact between the each of the substrates and a jig, the contact during conveyance of the substrates. Such contact may be caused by human errors in addition to design errors.

Since the damper frame 125 is larger than the nozzle substrate 10 in the plane, for example, the nozzle substrate 10 can be prevented from coming into contact with the outside during the joining of the substrates, and the nozzle substrate 10 can be prevented from being chipped, scratched, or cracked due to the contact with the outside. Accordingly, a decrease in the yield rate can be prevented.

Since the liquid chamber substrate 122 is larger than the nozzle substrate 10 in the plane, the nozzle substrate 10 can be prevented from being cracked.

The reason why the damper frame 125 is less influenced due to the chips, the scratches, and the cracks is that, for example, the damper frame 125 has a simpler structure as compared to structures of other substrates. In other words, the damper frame 125 does not have a pattern that has an influence on the liquid discharging performance as compared with the other substrates. Accordingly, even when the damper frame 125 comes into contact with the outside, the damper frame 125 has less influence on the liquid discharging performance as compared to the liquid chamber substrate 122 and the nozzle substrate 10.

The damper frame 125 in the present embodiment does not have the individual channel, the pressure chamber, the piezoelectric element, and the nozzle, but has a common channel and a damper chamber. Thus, the damper frame 125 has less influence on the liquid discharging performance due to the contact with the outside as compared to the other substrates. When chips, scratches, or cracks are generated in the liquid chamber substrate 122 having the pressure chamber, for example, the distortion of the pressure chamber occurs, and the liquid discharging performance is deteriorated. In addition, for example, when chips, scratches, or cracks are generated in the nozzle substrate 10 having the nozzle, the liquid discharging performance in the nozzle is deteriorated.

Since the damper frame 125 is larger than the liquid chamber substrate 122, for example, in a case where the damper frame 125 comes into contact with the outside during the joining of the substrates, the damper frame comes into contact with the outside earlier than the liquid chamber substrate 122 and the nozzle substrate 10. Therefore, the damper frame 125 also plays a role of protecting the liquid chamber substrate 122 and the nozzle substrate 10. Even when the damper frame 125 comes into contact with the outside, the damper frame 125 has less influence on, for example, liquid flow and the liquid discharging performance as compared to the other substrates, and the decrease in the yield rate can be prevented.

FIGS. 8A to 8C are schematic views of a liquid discharge head according to a comparative example, which is different from the present embodiment. FIG. 8A is a schematic cross-sectional view similar to FIG. 7A, and FIGS. 8B and 8C are schematic plan views similar to FIG. 7B. FIG. 8C is a plan view of the liquid discharge head according to the comparative example when chips, scratches, or cracks are generated in the liquid chamber substrate 122.

As illustrated in FIGS. 8A and 8B, in the plane in the lamination direction of the substrates, the sizes of the substrates are as follows: the nozzle substrate 10 is smaller than the liquid chamber substrate 122, and the liquid chamber substrate 122 is as large as the damper frame 125. In other words, the liquid chamber substrate 122 and the damper frame 125 have the same size in the plane.

Accordingly, the liquid chamber substrate 122 is exposed to the outermost circumference. Therefore, for example, a side face of the liquid chamber substrate 122 is exposed and bared.

In the comparative example, for example, the liquid chamber substrate 122 comes into contact with the outside during the joining of the substrates. As a result, chips, scratches, or cracks are generated in the liquid chamber substrate 122. Therefore, the yield rate decreases. In FIG. 8C, chips 128*a* and 128*b* and a scratch and a crack 129 are generated in the liquid chamber substrate 122. The chips 128*a* and 128*b* and the scratch and the crack 129 generated in the liquid chamber substrate 122 adversely affect, for example, the liquid flow and the liquid discharging performance, and the yield rate decreases.

In the present embodiment, the sizes of the substrates in the plane in the lamination direction of the substrates can be appropriately changed. In the embodiment illustrated in FIG. 7B, the damper frame 125 (the frame substrate) is larger than the other substrates in both a longitudinal direction and a transverse direction of the substrate.

In other words, in the present embodiment, the nozzle substrate, the liquid chamber substrate, and the frame substrate have longitudinal directions and transverse directions in the plane viewed in the lamination direction of the substrates, the longitudinal directions of the substrates are the same direction, and the transverse directions of the substrates are the same direction. The liquid chamber substrate has the outer shape larger than the outer shape of the nozzle substrate in the longitudinal directions and the transverse directions, and the frame substrate has the outer shape larger than the outer shape of the liquid chamber substrate in the longitudinal directions and the transverse directions, in the plane viewed in the lamination direction of the substrates.

Since the damper frame 125 is larger than the other substrates in both the longitudinal directions and the transverse directions of the substrates as described above, the liquid chamber substrate 122 and the nozzle substrate 10 can be easily prevented from coming into contact with the outside. In the present embodiment, four corners of the liquid chamber substrate 122 and four corners of the nozzle substrate 10 are less likely to come into contact with the outside, and the yield rate can be further reduced. Since chips are likely to be generated in the four corners of the substrates, the chips of the liquid chamber substrate 122 and the nozzle substrate 10 are easily prevented according to the present embodiment.

In the present embodiment, another example will be described below.

Figure 9:
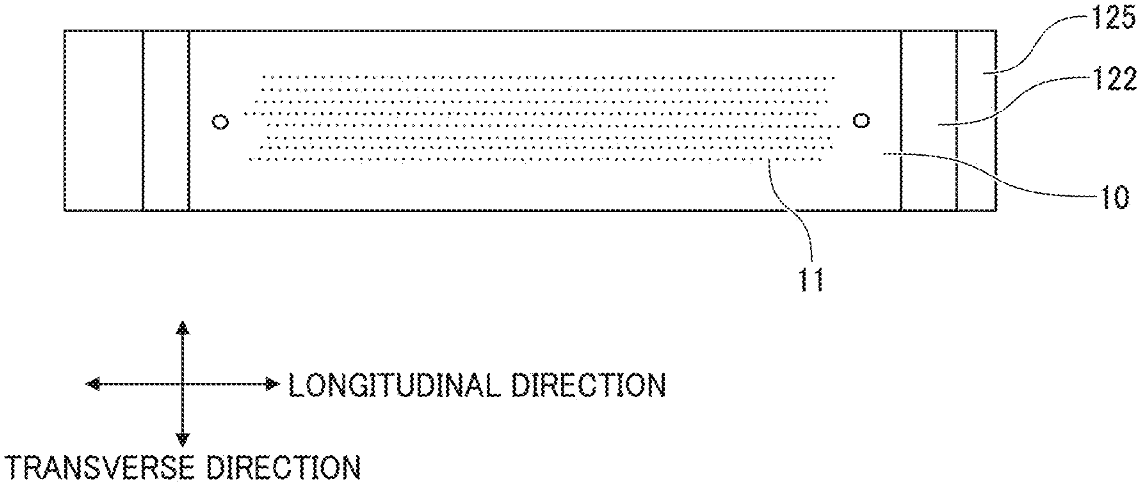
FIG. 9 is a plan view of a liquid discharge head according to another embodiment of the present disclosure.

FIG. 9 is a plan view of a liquid discharge head in the lamination direction of the substrates, according to another embodiment of the present disclosure. As illustrated in FIG. 9, the damper frame 125 (the frame substrate) is larger than the other substrates only in the longitudinal direction. The damper frame 125 has the same size as the liquid chamber substrate 122 and the nozzle substrate 10 in the transverse direction.

In other words, in the present embodiment, the nozzle substrate, the liquid chamber substrate, and the frame substrate have longitudinal directions and transverse directions in the plane viewed in the lamination direction of the substrates, the longitudinal directions of the substrates are the same direction, and the transverse directions of the substrates are the same direction. The liquid chamber substrate has the outer shape larger than the outer shape of the nozzle substrate only in the longitudinal directions, and the frame substrate has the outer shape larger than the outer shape of the liquid chamber substrate only in the longitudinal directions, in the plane viewed in the lamination direction of the substrates.

In the present embodiment, the sizes of the substrates only in the longitudinal directions are as follows: the nozzle substrate 10 is smaller than the liquid chamber substrate 122, and the liquid chamber substrate 122 is smaller than the damper frame 125 in the plane viewed in the lamination direction of the substrates.

Also in the present embodiment, it is possible to reduce a risk of damage of the liquid chamber substrate 122 and the nozzle substrate 10 due to the contact with the outside. On the other hand, in the present embodiment, since the damper frame 125 is larger than the other substrates only in the longitudinal direction, enlargement of the damper frame 125 can be minimized as compared to the embodiment illustrated in FIG. 7B. Accordingly, such a configuration does not increase the cost of components. In the present embodiment, when the substrates have a portion which is likely to contact with the outside depending on a jig or a device used in a manufacturing process, the damper frame 125 can be appropriately designed to be enlarged by limiting to the portion.

Figure 10:
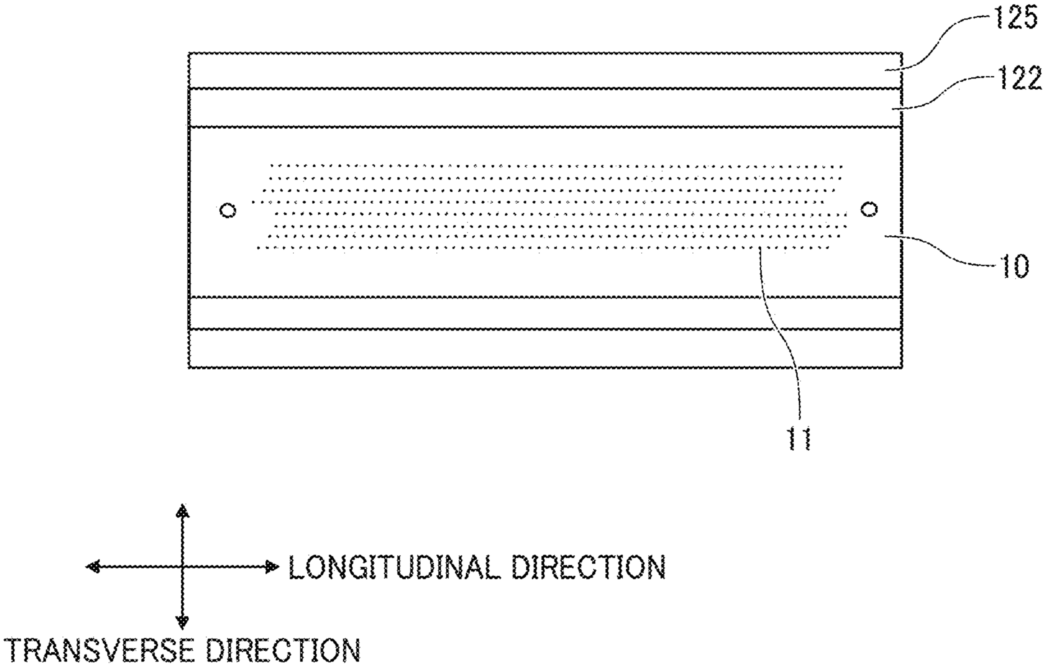
FIG. 10 is a plan view of a liquid discharge head according to yet another embodiment of the present disclosure.

FIG. 10 is a plan view of a liquid discharge head in the lamination direction of the substrates, according to yet another embodiment of the present disclosure. As illustrated in FIG. 10, the damper frame 125 (the frame substrate) is larger than the other substrates only in the transverse direction. The damper frame 125 has the same size as the liquid chamber substrate 122 and the nozzle substrate 10 in the longitudinal direction.

In other words, in the present embodiment, the nozzle substrate, the liquid chamber substrate, and the frame substrate have longitudinal directions and transverse directions in the plane viewed in the lamination direction of the substrates, the longitudinal directions of the substrates are the same direction, and the transverse directions of the substrates are the same direction. The liquid chamber substrate has the outer shape larger than the outer shape of the nozzle substrate only in the transverse directions, and the frame substrate has the outer shape larger than the outer shape of the liquid chamber substrate only in the transverse directions, in the plane viewed in the lamination direction of the substrates.

In the present embodiment, the sizes of the substrates only in the transverse directions are as follows, the nozzle substrate 10 is smaller than the liquid chamber substrate 122, and the liquid chamber substrate 122 is smaller than the damper frame 125 in the plane viewed in the lamination direction of the substrates.

Also in the present embodiment, it is possible to reduce a risk of damage of the liquid chamber substrate 122 and the nozzle substrate 10 due to the contact with the outside. On the other hand, in the present embodiment, since the damper frame 125 is larger than the other substrates only in the transverse direction, enlargement of the damper frame 125 can be minimized as compared to the embodiment illustrated in FIG. 7B. Accordingly, such a configuration does not increase the cost of components. In the present embodiment, when the substrates have a portion which is likely to contact with the outside depending on a jig or a device used in a manufacturing process, the damper frame 125 can be appropriately designed to be enlarged by limiting to the portion.

Another Embodiment of Liquid Discharge Head

Another Embodiment of the Present Disclosure Will be Described Below

In the above-described embodiments, the frame substrate having the outermost circumference in the lamination direction of the substrates is the damper frame 125. Embodiments of the present disclosure are not limited the damper frame 125 serving as the frame substrate. Alternatively, a substrate, which is least likely to be affected by chips, scratches, and cracks among the substrates joined to each other, may be larger than the other substrates in the plane. Such a configuration can protect the substrates from chips, scratches, and cracks due to the contact with the outside, and prevent the decrease in the yield rate.

Examples of the substrate less influenced by chips, scratches, and cracks include a substrate, even in contact with the outside, having less influence on the liquid discharging performance. As such substrate, the frame substrate is suitable. The frame substrate has no pattern having the influence on the liquid discharging performance as compared to the other substrates. Examples of the frame substrate include a substrate having a pattern alone, such as an escape hole of an adhesive.

The liquid discharge head according to the present embodiment includes: a liquid chamber substrate that has a pressure chamber with a volume changed by a pressure generator; a nozzle substrate that has a nozzle corresponding to the pressure chamber and is joined to the liquid chamber substrate: and a frame substrate that is joined to the liquid chamber substrate on a side opposite to a side to which the nozzle substrate is joined. The nozzle substrate, the liquid chamber substrate, and the frame substrate are made of Si. The liquid chamber substrate has an outer shape larger than an outer shape of the nozzle substrate, and the frame substrate has an outer shape larger than the outer shape of the liquid chamber substrate, in the plane viewed in the lamination direction of the substrates. Also in the present embodiment, it is possible to reduce the damage of the substrate having the influence on the liquid discharging performance and increase the yield rate similarly to the above-the above-described embodiments.

The frame substrate in the present embodiment does not unnecessarily have a damper chamber. The frame substrate is made of Si. The frame substrate made of Si is used because, for example, when a micro electronic mechanical system (MEMS) component is studied, it is considered that the frame substrate made of Si has less influence on the liquid discharge when the frame substrate contacts the outside, for example, during manufacturing of a head. In addition, as described in the above embodiments, the substrate made of Si facilitates the processing such as the thinning and the downsizing.

As a material of the frame substrate, a silicon wafer of monocrystalline Si is preferably used.

When the silicon wafer is used, the main component of the substrate may be Si, and a small amount of an additive or dopant such as phosphorus or boron may be added. A protective film may be formed on the surface of the frame substrate. The protective film may be a film of an inorganic substance such as a metal oxide or metal nitride. e.g., silicon oxide, silicon nitride, or tantalum oxide, or may be a film of an organic substance such as a resin. These protective films can prevent Si, which is a base material of the channel substrate 20 and the sub-frame 121, from being eluted by the contact with a liquid such as ink. In other words, the portion of the frame substrate that serves as the base material thereof may be mainly made of Si.

Further, the frame substrate according to the present embodiment is preferably a substrate not including a metal member, and examples of such substrate include a substrate on which a wiring pattern is not formed.

Since the wiring pattern is not formed in the frame substrate, even when the substrate comes in contact with the outside, the liquid discharge is less likely to be influenced. The wiring pattern may be, for example, a wiring which is connected to the piezoelectric element included in the liquid chamber substrate to transmit an electric signal. As described above, metal oxides and metal nitrides such as silicon oxide, silicon nitride, and tantalum oxide formed on the surface of the frame substrate do not correspond to the metal member.

As described above, the frame substrate made of Si according to the present embodiment includes a case where the main component of the portion serving as the base material forming the substrate is Si. The base material forming the frame substrate means a main member that maintains the structure of the substrate.

The above-described configurations with reference to FIGS. 1 to 7B, 9, and 10 can also be appropriately applied in the present embodiment. For example, the definitions of the longitudinal directions and the transverse directions with reference to FIGS. 7A, 7B, 9, and 10 can also be applied in the present embodiment.

Liquid Discharge Unit and Liquid Discharge Apparatus

Figure 11:
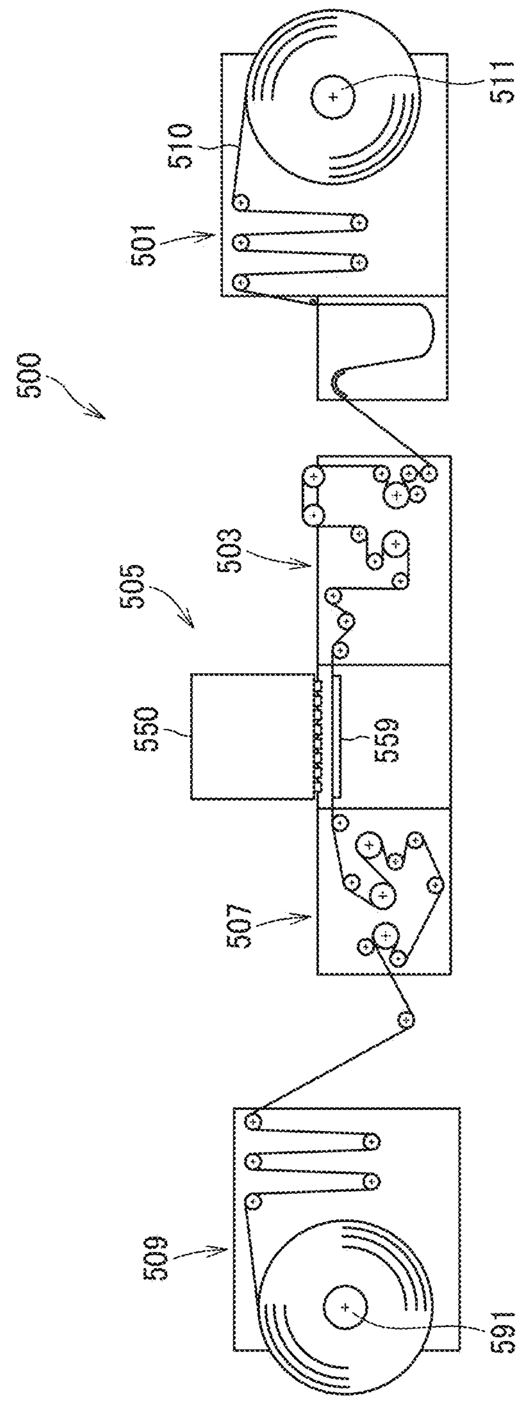
FIG. 11 is a schematic view of a liquid discharge apparatus according to an embodiment of the present disclosure.
Figure 12:
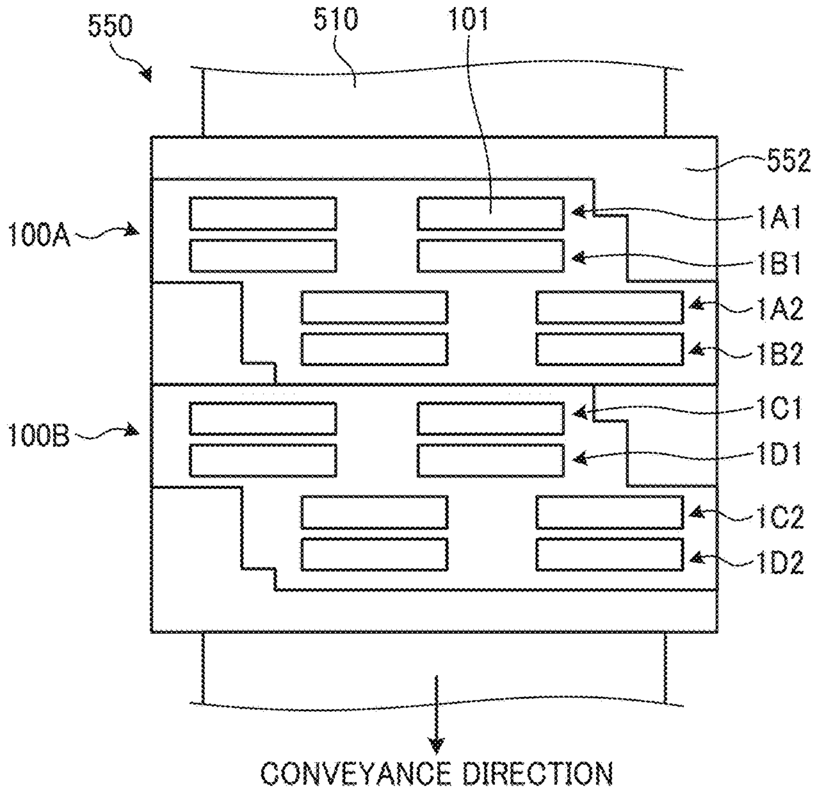
FIG. 12 is a plan view of a head unit of the liquid discharge apparatus of FIG. 11.

A liquid discharge apparatus according to an embodiment of the present disclosure will be described below with reference to FIGS. 11 and 12. FIG. 11 is a schematic view of the liquid discharge apparatus according to the present embodiment. FIG. 12 is a plan view of a head unit of the liquid discharge apparatus of FIG. 11.

A printing device 500 as the liquid discharge apparatus includes: a feeder 501 to feed a continuous medium 510 as a recording medium; a guide conveyor 503 to guide and convey the continuous medium 510, fed from the feeder 501, to a printer 505; the printer 505 to discharge a liquid onto the continuous medium 510 to form an image: a dryer 507 to dry the continuous medium 510; and a carrier 509 to carry out the continuous medium 510.

The continuous medium 510 is sent out from a winding roller 511 of the feeder 501, is guided and conveyed by rollers of the feeder 501, the guide conveyor 503, the dryer 507, and the carrier 509, and is wound up by a wind-up roller 591 of the carrier 509.

In the printer 505, the continuous medium 510 is conveyed opposite to a head unit 550 on a conveyance guide member 559, and printed with an image by the liquid discharged from the head unit 550.

As illustrated in FIG. 12, the head unit 550 includes two head modules 100A and 100B according to the present embodiment on a common base member 552.

When a direction in which the heads 101 are lined up in a direction perpendicular to a conveyance direction of the head module 100 is defined as a head arrangement direction, head arrays 1A1 and 1A2 of the head module 100A discharge a liquid of the same color. Similarly, head arrays 1B1 and 1B2 of the head module 100A are grouped as one set, head arrays 1C1 and 1C2 of the head module 100B are grouped as one set, and head arrays 1D1 and 1D2 of the head module 100B are grouped as one set. Each of the sets discharges a liquid of a desired color.

Figure 13:
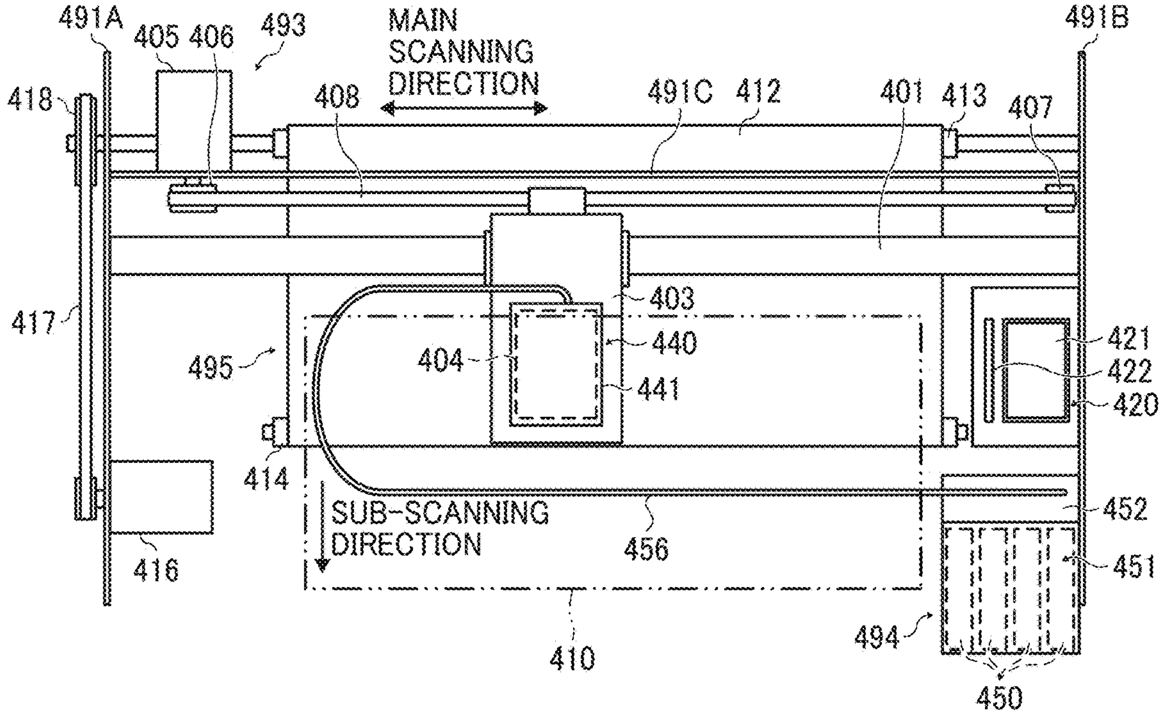
FIG. 13 is a plan view of a liquid discharge apparatus according to another embodiment of the present disclosure.
Figure 14:
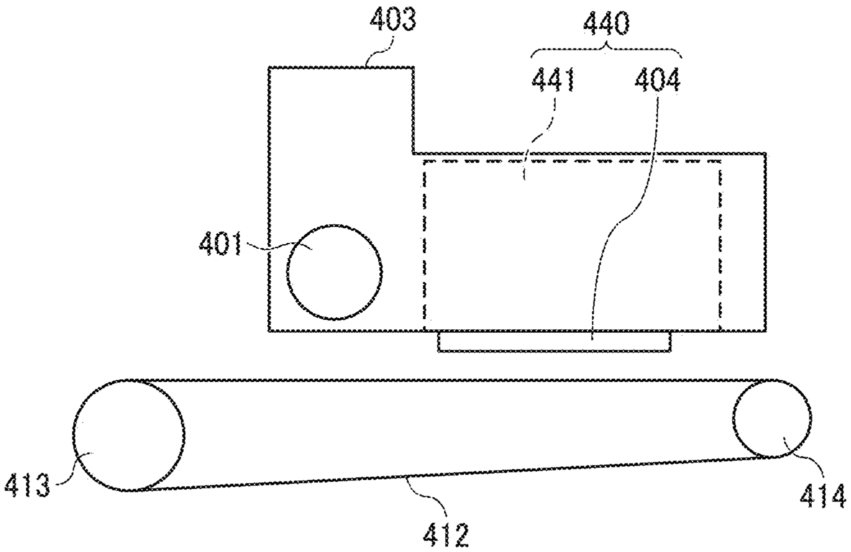
FIG. 14 is a side view of the liquid discharge apparatus of FIG. 13.

A liquid discharge apparatus according to another embodiment of the present disclosure will be described below with reference to FIGS. 13 and 14. FIG. 13 is a plan view of a prat of the liquid discharge apparatus according to the present embodiment. FIG. 14 is a side view of the part of the liquid discharge apparatus of FIG. 13.

The liquid discharge apparatus is a serial type apparatus. A main scanning moving mechanism 493 moves a carriage 403 reciprocally in a main scanning direction. The main scanning moving mechanism 493 includes a guide member 401, a main scanning motor 405, and a timing belt 408. The guide member 401 is bridged between a left-side plate 491A and a right-side plate 491B to moveably hold the carriage 403. The main scanning motor 405 moves the carriage 403 reciprocally in the main scanning direction via the timing belt 408 bridged between a drive pulley 406 and a driven pulley 407.

The carriage 403 has a liquid discharge unit 440 integrated with a liquid discharge head 404 according to the present disclosure and a head tank 441 that supplies a liquid to the liquid discharge head 404. The liquid discharge head 404 of the liquid discharge unit 440 discharges color liquids of, for example, yellow (Y), cyan (C), magenta (M), and black (K). The liquid discharge head 404 has a nozzle array including a plurality of nozzles 11 arranged in a sub-scanning direction perpendicular to the main scanning direction, and mounted with the discharge direction facing downward. As the liquid discharge head 404, for example, the each of the heads 101 described above can be used.

The liquid stored in liquid cartridges 450 is supplied to the head tank 441 by a supply mechanism 494 for supplying the liquid stored outside the liquid discharge head 404 to the liquid discharge head 404.

The supply mechanism 494 includes a cartridge holder 451 as a filler to mount the liquid cartridges 450, a tube 456, and a liquid feeder 452 including a liquid feeding pump. The liquid cartridges 450 are detachably mounted on the cartridge holder 451. The liquid is fed from the liquid cartridges 450 to the head tank 441 by the liquid feeder 452 via the tube 456.

The liquid discharge apparatus includes a conveyance mechanism 495 for conveying a sheet 410 as a recording medium. The conveyance mechanism 495 includes a conveyance belt 412 as a conveyor and a sub-scanning motor 416 for driving the conveyance belt 412.

The conveyance belt 412 attracts the sheet 410 to convey the sheet 410 to a position facing the liquid discharge head 404. The conveyance belt 412 is an endless belt stretched between a conveyance roller 413 and a tension roller 414. The attraction can be performed by, for example, electrostatic attraction or air suction.

The conveyance roller 413 is rotationally driven by the sub-scanning motor 416 via a timing belt 417 and a timing pulley 418 to move the conveyance belt 412 circumferentially in the sub-scanning direction.

At one side in the main scanning direction of the carriage 403, a maintenance recovery mechanism 420 to maintain and recover the liquid discharge head 404 is arranged on a lateral side of the conveyance belt 412.

The maintenance recovery mechanism 420 includes, for example, a cap member 421 to cap a nozzle face (a face on which the nozzle 11 is formed) of the liquid discharge head 404, and a wiper member 422 to wipe the nozzle face.

The main scanning moving mechanism 493, the supply mechanism 494, the maintenance recovery mechanism 420, and the conveyance mechanism 495 are mounted to a housing that includes the left-side plate 491A, the right-side plate 491B, and a rear plate 491C.

In the liquid discharge apparatus thus configured, the sheet 410 is fed on and attracted to the conveyance belt 412, and conveyed in the sub-scanning direction by circumferential rotation of the conveyance belt 412.

The liquid discharge head 404 is driven in response to image signals while the carriage 403 moves in the main scanning direction, to discharge the liquid to the sheet 410 stopped, thus forming an image.

Accordingly, the liquid discharge apparatus includes the liquid discharge head according to the present embodiment, thus allowing stable formation of high-quality images.

Figure 15:
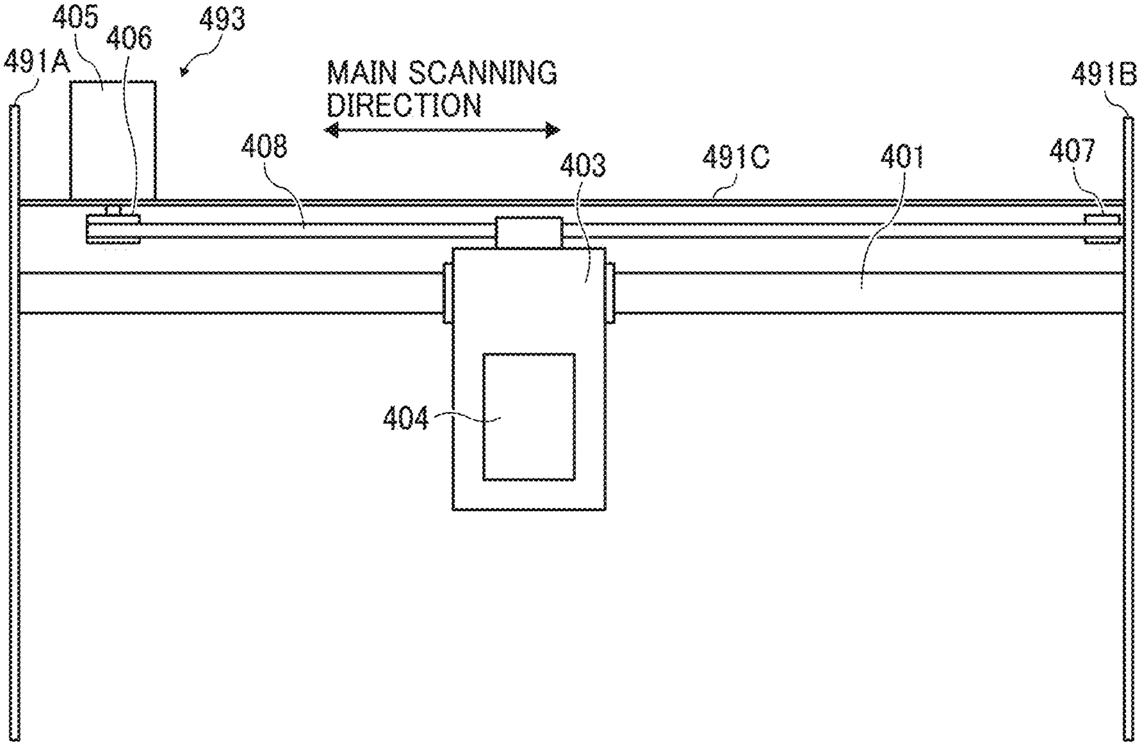
FIG. 15 is a plan view of a liquid discharge unit according to an embodiment of the present disclosure.

A liquid discharge unit according to an embodiment of the present disclosure will be described below with reference to FIG. 15. FIG. 15 is a plan view of a part of the liquid discharge unit according to the present embodiment.

The liquid discharge unit includes a housing, the main scanning moving mechanism 493, the carriage 403, and the liquid discharge head 404 among components of the liquid discharge apparatus. The left-side plate 491A, the right-side plate 491B, and the rear plate 491C constitute the housing.

The liquid discharge unit may further include at least one of the maintenance recovery mechanism 420 described above or the supply mechanism 494 on, for example, the right-side plate 491B of the liquid discharge unit.

Figure 16:
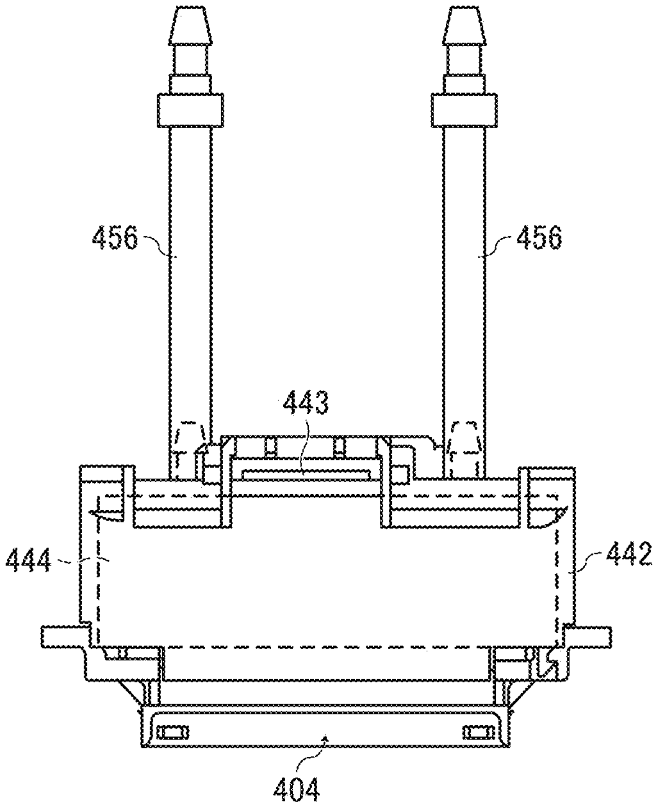
FIG. 16 is a plan view of a liquid discharge unit according to another embodiment of the present disclosure.

A liquid discharge unit according to another embodiment of the present disclosure will be described below with reference to FIG. 16. FIG. 16 is a front view of the liquid discharge unit according to the present embodiment.

The liquid discharge unit includes the liquid discharge head 404 on which a channel component 444 is mounted and a tube 456 coupled to the channel component 444.

The channel component 444 is arranged inside a cover 442. Instead of the channel component 444, the liquid discharge unit may include the head tank 441. An upper part of the channel component 444 has a connector 443 electrically coupled with the liquid discharge head 404.

In the present application, the "liquid discharge apparatus" includes the liquid discharge head or the liquid discharge unit and drives the liquid discharge head to discharge the liquid. The liquid discharge apparatus may be, for example, any apparatus that can discharge the liquid to a material to which the liquid can adhere or any apparatus to discharge the liquid into gas or another liquid.

The "liquid discharge apparatus" can also include a unit for feeding, conveying, and ejecting a material to which the liquid can adhere, as well as a pretreatment apparatus, and a post-treatment apparatus.

The "liquid discharge apparatus" may be, for example, an image forming apparatus to form an image on a paper sheet by discharging ink, or a stereoscopic shaping apparatus (a three-dimensional shaping apparatus) to discharge a shaping liquid to a powder layer in which powder is formed in layers so as to shape a stereoscopic article (a three-dimensional article).

The "liquid discharge apparatus" is not limited to an apparatus to visualize meaningful images, such as letters or figures by the liquid discharged. For example, the liquid discharge apparatus includes an apparatus to form a meaningless pattern, or shape a three-dimensional image.

The term "material to which the liquid can adhere" above denotes, for example, a material to which the liquid can at least temporarily adhere, a material to which the liquid is adhered and fixed, or a material to which the liquid is adhered and into which the liquid permeates. Examples of the material include recording media such as a paper sheet, a piece of recording paper, a recording paper sheet, a film, and a piece of cloth; electronic components such as an electronic substrate and a piezoelectric element; and media such as a powder layer (a dust layer), an organ model, and a test cell. The material includes any material to which the liquid is adhered, unless particularly limited.

Examples of the material "to which the liquid can adhere" above include any materials to which the liquid can adhere even temporarily, such as paper, thread, fiber, fabric, leather, metal, plastic, glass, wood, ceramic, construction materials such as a wallpaper or a floor material, and a cloth textile.

Examples of the "liquid" include ink, a treatment liquid, a deoxyribonucleic acid (DNA) sample, a resist, a pattern material, a binder, a shaping liquid, and a solution or a dispersion liquid containing amino acid, protein, or calcium.

The "liquid discharge apparatus" may be an apparatus to relatively move the liquid discharge head and the material to which the liquid can adhere. However, the liquid discharge apparatus is not limited to such apparatus. For example, the liquid discharge apparatus may be a serial type apparatus that moves the liquid discharge head, or a line type apparatus that does not move the liquid discharge head.

Examples of the "liquid discharge apparatus" further include: a treatment liquid applying apparatus to discharges the treatment liquid onto the paper sheet to apply the treatment liquid to a surface of the paper sheet for reforming the surface of the paper sheet; and an injection granulation apparatus that injects a composition liquid in which a raw material is dispersed in a solution through a nozzle to granulate fine particles of the raw material.

The "liquid discharge unit" includes the liquid discharge head with functional components and mechanisms integrated, and is an assembly of components related to the liquid discharge. For example, the "liquid discharge unit" includes a combination of the liquid discharge head with at least one of the head tank, the carriage, the supply mechanism, the maintenance recovery mechanism, or the main scanning moving mechanism.

Here, the integration refers to, for example, a way through which the liquid discharge head and the functional components or the mechanisms are fixed to each other by, for example, fastening, adhesion, or engagement, or a way through which the liquid discharge head is held movably relative to the functional components or the mechanisms, vice versa. The liquid discharge head, the functional components, and the mechanisms may be detachably attached to each other.

For example, the liquid discharge head and the head tank may be integrated to be the liquid discharge unit as the liquid discharge unit 440 illustrated in FIG. 14. The liquid discharge head and the head tank may be integrated by being coupled with each other via a tube or the like. Here, a unit including a filter may be added between the head tank and the liquid discharge head of the liquid discharge unit.

The liquid discharge head and the carriage may be integrated to be the liquid discharge unit.

The liquid discharge head is movably held on the guide member that constitutes a part of the scanning moving mechanism. Thus, the liquid discharge head and the scanning moving mechanism may be integrated to be the liquid discharge unit. The liquid discharge head, the carriage, and the main scanning moving mechanism may be integrated to be the liquid discharge unit as illustrated in FIG. 15.

The liquid discharge unit has the cap member as a part of the maintenance recovery mechanism fixed to the carriage with the liquid discharge head. Thus, the liquid discharge head, the carriage, and the maintenance recovery mechanism may be integrated to be the liquid discharge unit.

The tube is coupled to the liquid discharge head having the head tank or the channel component as illustrated in FIG. 16. Thus, the liquid discharge head and the supply mechanism may be integrated to be the liquid discharge unit.

The main scanning moving mechanism may include the guide member alone. The supply mechanism may include the tube alone or a loading unit alone.

The pressure generator used in the "liquid discharge head" is not limited. For example, the piezoelectric element is not limited to the piezoelectric actuator (or a laminated-type piezoelectric element may be used) described in the above embodiments, and may be, for example, a thermal actuator that employs a thermoelectric transducer element such as a thermal resistor, or an electrostatic actuator including a diaphragm and opposed electrodes.

The image forming, recording, word printing, imprinting, printing, and shaping used in the present application are synonymous with each other.

Aspects of the present disclosure are, for example, as follows.

Aspect 1

A liquid discharge head includes: a liquid chamber substrate that has a pressure chamber with a volume changed by a pressure generator: a nozzle substrate that has a nozzle corresponding to the pressure chamber and is joined to the liquid chamber substrate; and a frame substrate that is joined to the liquid chamber substrate on a side opposite to a side to which the nozzle substrate is joined. At least a part between the frame substrate and the liquid chamber substrate has a damper. The liquid chamber substrate has an outer shape larger than an outer shape of the nozzle substrate, and the frame substrate has an outer shape larger than the outer shape of the liquid chamber substrate, in a plane viewed in a lamination direction of the substrates.

In other words, a liquid discharge head includes a chamber substrate, a nozzle substrate, a damper, and a frame substrate. The chamber substrate includes a pressure chamber and a pressure generator to apply pressure to the pressure chamber to change a volume of the pressure chamber. The chamber substrate has a first face and a second face opposite to the first face. The nozzle substrate is disposed on the first face of the chamber substrate in a lamination direction. The nozzle substrate has a nozzle communicating with the pressure chamber. The damper is disposed on the second face of the chamber substrate in the lamination direction. The frame substrate is disposed over the damper in the lamination direction. The chamber substrate has a first area in an in-plane direction of the chamber substrate orthogonal to the lamination direction. The nozzle substrate has a second area smaller than the first area in the in-plane direction. The frame substrate has a third area larger than the first area in the in-plane direction.

Aspect 2

In the liquid discharge head according to Aspect 1, the nozzle substrate, the liquid chamber substrate, and the frame substrate are made of Si.

In other words, each of the nozzle substrate, the chamber substrate, and the frame substrate includes silicon.

Aspect 3

A liquid discharge head includes: a liquid chamber substrate that has a pressure chamber with a volume changed by a pressure generator; a nozzle substrate that has a nozzle corresponding to the pressure chamber and is joined to the liquid chamber substrate: and a frame substrate that is joined to the liquid chamber substrate on a side opposite to a side to which the nozzle substrate is joined. The nozzle substrate, the liquid chamber substrate, and the frame substrate are made of Si. The liquid chamber substrate has an outer shape larger than an outer shape of the nozzle substrate, and the frame substrate has an outer shape larger than the outer shape of the liquid chamber substrate, in a plane viewed in a lamination direction of the substrates.

In other words, a liquid discharge head includes a chamber substrate, a nozzle substrate, and a frame substrate. The chamber substrate made of silicon includes a pressure chamber and a pressure generator to apply pressure to the pressure chamber to change a volume of the pressure chamber. The chamber substrate has a first face and a second face opposite to the first face. The nozzle substrate is disposed on the first face of the chamber substrate in a lamination direction. The nozzle substrate is made of silicon and has a nozzle communicating with the pressure chamber. The frame substrate is made of silicon and disposed over the second face of the chamber substrate in the lamination direction. The chamber substrate has a first area in an in-plane direction of the chamber substrate orthogonal to the lamination direction. The nozzle substrate has a second area smaller than the first area in the in-plane direction. The frame substrate has a third area larger than the first area in the in-plane direction.

Aspect 4

In the liquid discharge head according to Aspect 3, the frame substrate does not have a wiring pattern.

In other words, the liquid discharge head further includes a wiring pattern in substrates including the chamber substrate and the nozzle substrate other than the frame substrate.

Aspect 5

In the liquid discharge head according to any one of Aspects 1 to 4, the nozzle substrate, the liquid chamber substrate, and the frame substrate have longitudinal directions and transverse directions in the plane viewed in the lamination direction of the substrates, the longitudinal directions of the substrates are the same direction, and the transverse directions of the substrates are the same direction. The liquid chamber substrate has the outer shape larger than the outer shape of the nozzle substrate only in the longitudinal directions, and the frame substrate has the outer shape larger than the outer shape of the liquid chamber substrate only in the longitudinal directions, in the plane viewed in the lamination direction of the substrates.

In other words, the in-plane direction has a longitudinal direction and a transverse direction orthogonal to the longitudinal direction. Each of the nozzle substrate, the chamber substrate, and the frame substrate has an identical width in the transverse direction. The nozzle substrate is smaller than the chamber substrate in the longitudinal direction. The frame substrate is larger than the chamber substrate in the longitudinal direction.

Aspect 6

In the liquid discharge head according to any one of Aspects 1 to 4, the nozzle substrate, the liquid chamber substrate, and the frame substrate have longitudinal directions and transverse directions in the plane viewed in the lamination direction of the substrates, the longitudinal directions of the substrates are the same direction, and the transverse directions of the substrates are the same direction. The liquid chamber substrate has the outer shape larger than the outer shape of the nozzle substrate only in the transverse directions, and the frame substrate has the outer shape larger than the outer shape of the liquid chamber substrate only in the transverse directions, in the plane viewed in the lamination direction of the substrates.

In other words, the in-plane direction has a longitudinal direction and a transverse direction orthogonal to the longitudinal direction. Each of the nozzle substrate, the chamber substrate, and the frame substrate has an identical length in the longitudinal direction. The nozzle substrate is smaller than the chamber substrate in the transverse direction. The frame substrate is larger than the chamber substrate in the transverse direction.

Aspect 7

In the liquid discharge head according to any one of Aspects 1 to 4, the nozzle substrate, the liquid chamber substrate, and the frame substrate have longitudinal directions and transverse directions in the plane viewed in the lamination direction of the substrates, the longitudinal directions of the substrates are the same direction, and the transverse directions of the substrates are the same direction. The liquid chamber substrate has the outer shape larger than the outer shape of the nozzle substrate in the longitudinal directions and the transverse directions, and the frame substrate has the outer shape larger than the outer shape of the liquid chamber substrate in the longitudinal directions and the transverse directions, in the plane viewed in the lamination direction of the substrates.

In other words, the in-plane direction has a longitudinal direction and a transverse direction orthogonal to the longitudinal direction. The nozzle substrate is smaller than the chamber substrate in the longitudinal direction and the transverse direction. The frame substrate is larger than the chamber substrate in the longitudinal direction and the transverse direction.

Aspect 8

A head module includes the liquid discharge head according to any one of Aspects 1 to 7.

In other words, a head module includes multiple liquid discharge heads including the liquid discharge head according to any one of Aspects 1 to 7, to discharge a liquid from at least one of the multiple liquid discharge heads.

Aspect 9

A liquid discharge unit includes the liquid discharge head according to any one of Aspects 1 to 7.

In other words, a liquid discharge unit includes the liquid discharge head according to any one of Aspects 1 to 7, to discharge a liquid and a head tank to supply the liquid to the liquid discharge head.

Aspect 10

A liquid discharge apparatus includes the head module according to Aspect 8.

In other words, a liquid discharge apparatus includes the head module according to Aspect 8, to discharge the liquid onto a recording medium and a conveyor to convey the recording medium to a position facing the head module.

Aspect 11

A liquid discharge apparatus includes the liquid discharge unit according to Aspect 9.

In other words, a liquid discharge apparatus includes the liquid discharge unit according to Aspect 9, to discharge the liquid onto a recording medium and a conveyor to convey the recording medium to a position facing the liquid discharge unit.

Aspect 12

In the liquid discharge head according to Aspect 1, the damper has an area identical to the first area of the chamber substrate in the in-plane direction.

As described above, according to one aspect of the present disclosure, it is possible to provide a liquid discharge head that can reduce damage on a substrate having an influence on liquid discharging performance and increase a yield rate.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge head comprising:

a chamber substrate including:

a pressure chamber;

a pressure generator to apply pressure to the pressure chamber to change a volume of the pressure chamber, the chamber substrate having:

a first face; and a second face opposite to the first face;

a nozzle substrate on the first face of the chamber substrate in a lamination direction, the nozzle substrate having a nozzle communicating with the pressure chamber;

a damper on the second face of the chamber substrate in the lamination direction; and a frame substrate over the damper in the lamination direction, wherein the frame substrate has a second damper chamber, the second damper chamber faces the damper, and the damper can vibrate in the second damper chamber, wherein the chamber substrate has a first area in an in-plane direction of the chamber substrate orthogonal to the lamination direction, the nozzle substrate has a second area smaller than the first area in the in-plane direction, and the frame substrate has a third area larger than the first area in the in-plane direction.

2. The liquid discharge head according to claim 1, wherein each of the nozzle substrate, the chamber substrate, and the frame substrate includes silicon.

3. A liquid discharge head comprising:

a chamber substrate made of silicon including:

a pressure chamber;

a pressure generator to apply pressure to the pressure chamber to change a volume of the pressure chamber, the chamber substrate having:

a first face; and a second face opposite to the first face;

a nozzle substrate on the first face of the chamber substrate in a lamination direction, the nozzle substrate made of silicon and having a nozzle communicating with the pressure chamber;

a damper on the second face of the chamber substrate in the lamination direction;

a frame substrate made of silicon, the frame substrate over the second face of the chamber substrate in the lamination direction; and the frame substrate over the damper in the lamination direction, wherein the frame substrate has a second damper chamber, the second damper chamber faces the damper, and the damper can vibrate in the second damper chamber, wherein the chamber substrate has a first area in an in-plane direction of the chamber substrate orthogonal to the lamination direction, the nozzle substrate has a second area smaller than the first area in the in-plane direction, and the frame substrate has a third area larger than the first area in the in-plane direction.

4. The liquid discharge head according to claim 3, further comprising a wiring pattern in substrates including the chamber substrate and the nozzle substrate other than the frame substrate.

5. The liquid discharge head according to claim 1, wherein the in-plane direction has a longitudinal direction and a transverse direction orthogonal to the longitudinal direction, each of the nozzle substrate, the chamber substrate, and the frame substrate has an identical width in the transverse direction, the nozzle substrate is smaller than the chamber substrate in the longitudinal direction, and the frame substrate is larger than the chamber substrate in the longitudinal direction.

6. The liquid discharge head according to claim 1, wherein the in-plane direction has a longitudinal direction and a transverse direction orthogonal to the longitudinal direction, each of the nozzle substrate, the chamber substrate, and the frame substrate has an identical length in the longitudinal direction, the nozzle substrate is smaller than the chamber substrate in the transverse direction, and the frame substrate is larger than the chamber substrate in the transverse direction.

7. The liquid discharge head according to claim 1, wherein the in-plane direction has a longitudinal direction and a transverse direction orthogonal to the longitudinal direction, the nozzle substrate is smaller than the chamber substrate in the longitudinal direction and the transverse direction, and the frame substrate is larger than the chamber substrate in the longitudinal direction and the transverse direction.

8. A head module comprising multiple liquid discharge heads including the liquid discharge head according to claim 1, to discharge a liquid from at least one of the multiple liquid discharge heads.

9. A liquid discharge unit comprising:

the liquid discharge head according to claim 1, to discharge a liquid; and a head tank to supply the liquid to the liquid discharge head.

10. A liquid discharge apparatus comprising:

the head module according to claim 8, to discharge the liquid onto a recording medium; and a conveyor to convey the recording medium to a position facing the head module.

11. A liquid discharge apparatus comprising:

the liquid discharge unit according to claim 9, to discharge the liquid onto a recording medium; and a conveyor to convey the recording medium to a position facing the liquid discharge unit.

12. The liquid discharge head according to claim 1, wherein the damper has an area identical to the first area of the chamber substrate in the in-plane direction.

13. The liquid discharge head according to claim 1, wherein each of the nozzle substrate and the chamber substrate includes silicon.

14. The liquid discharge head according to claim 1, wherein the nozzle substrate includes silicon.

15. The liquid discharge head according to claim 1, wherein the chamber substrate includes silicon.

16. The liquid discharge head according to claim 1, wherein the in-plane direction has a longitudinal direction and a transverse direction orthogonal to the longitudinal direction, and each of the nozzle substrate, the chamber substrate, and the frame substrate has an identical width in the transverse direction.

17. The liquid discharge head according to claim 1, wherein the in-plane direction has a longitudinal direction and a transverse direction orthogonal to the longitudinal direction, each of the nozzle substrate, the chamber substrate, and the frame substrate has an identical width in the transverse direction, and the nozzle substrate is smaller than the chamber substrate in the longitudinal direction.

* * * * *